(12) United States Patent
Amante

(10) Patent No.: US 12,115,881 B2
(45) Date of Patent: Oct. 15, 2024

(54) NON-INTEGRAL BATTERY COLD PLATE

(71) Applicant: Bell Textron Inc., Fort Worth, TX (US)

(72) Inventor: William A Amante, Grapevine, TX (US)

(73) Assignee: Textron Innovations Inc., Providence, RI (US)

(*) Notice: Subject to any disclaimer, the term of this patent is extended or adjusted under 35 U.S.C. 154(b) by 694 days.

(21) Appl. No.: 17/172,384

(22) Filed: Feb. 10, 2021

(65) Prior Publication Data
US 2022/0250507 A1 Aug. 11, 2022

(51) Int. Cl.
B60L 50/60 (2019.01)
B60L 53/50 (2019.01)
B60L 58/26 (2019.01)
B64C 1/38 (2006.01)
B64D 27/24 (2006.01)
H01M 10/613 (2014.01)
H01M 10/625 (2014.01)
H01M 10/6556 (2014.01)

(52) U.S. Cl.
CPC .............. B60L 58/26 (2019.02); B60L 50/60 (2019.02); B60L 53/50 (2019.02); B64C 1/38 (2013.01); B64D 27/24 (2013.01); H01M 10/613 (2015.04); H01M 10/625 (2015.04); H01M 10/6556 (2015.04); B60L 2200/10 (2013.01); H01M 2220/20 (2013.01)

(58) Field of Classification Search
USPC .......................... 320/106, 107, 108, 109, 110
See application file for complete search history.

(56) References Cited

U.S. PATENT DOCUMENTS

| | | | |
|---|---|---|---|
| 8,703,319 B1 | 4/2014 | Aston | |
| 8,920,594 B2 | 12/2014 | Carstensen | |
| 11,267,327 B2 | 3/2022 | Matecki | |
| 11,728,540 B2 | 8/2023 | Amante | |
| 2002/0162696 A1 | 11/2002 | Maus | |
| 2005/0180104 A1 | 8/2005 | Olesen | |
| 2006/0071124 A1 | 4/2006 | Young | |
| 2006/0105236 A1 | 5/2006 | Zhu | |
| 2006/0237166 A1 | 10/2006 | Otey | |
| 2010/0243346 A1 | 9/2010 | Anderson | |
| 2011/0189525 A1 | 8/2011 | Palanchon | |
| 2011/0206966 A1 | 8/2011 | Schmid | |
| 2011/0287287 A1 | 11/2011 | Kang | |
| 2012/0028099 A1* | 2/2012 | Aoki | H01M 10/643 429/120 |
| 2012/0121946 A1 | 5/2012 | Eckstein | |
| 2012/0156543 A1 | 6/2012 | Cicero | |
| 2013/0244077 A1 | 9/2013 | Palanchon | |

(Continued)

FOREIGN PATENT DOCUMENTS

| | | |
|---|---|---|
| CN | 102931364 | 2/2013 |
| DE | 102014200989 | 7/2015 |

(Continued)

Primary Examiner — Brian Ngo
(74) Attorney, Agent, or Firm — Frost Brown Todd LLP

(57) ABSTRACT

A nonintegral cold plate is described for providing cooling of battery charging. The nonintegrated cold plate can receive and circulate coolant against a surface of a battery or of a vehicle. After charging the nonintegrated cold plate can be removed to save weight on the vehicle's payload.

8 Claims, 8 Drawing Sheets

(56) References Cited

U.S. PATENT DOCUMENTS

| | | | |
|---|---|---|---|
| 2014/0305622 A1 | 10/2014 | Daubitzer | |
| 2015/0266387 A1 | 9/2015 | Garfinkel | |
| 2017/0047624 A1 | 2/2017 | Gunna | |
| 2018/0212222 A1* | 7/2018 | Barton | H01M 50/3425 |
| 2018/0304390 A1 | 10/2018 | Hirayama | |
| 2019/0237827 A1 | 8/2019 | Ge | |
| 2019/0252744 A1 | 8/2019 | Zimmermann | |
| 2019/0296300 A1 | 9/2019 | Zimmermann | |
| 2019/0319249 A1 | 10/2019 | Barton et al. | |
| 2019/0393671 A1 | 12/2019 | Mochalov | |
| 2020/0006824 A1 | 1/2020 | Lim | |
| 2020/0006825 A1 | 1/2020 | Lee | |
| 2020/0277061 A1 | 9/2020 | Becker | |
| 2020/0313260 A1* | 10/2020 | Wang | H01M 10/625 |
| 2022/0077520 A1* | 3/2022 | Donovan | H01M 50/20 |

FOREIGN PATENT DOCUMENTS

| | | |
|---|---|---|
| DE | 102014203644 | 9/2015 |
| DE | 102015107170 | 11/2016 |
| DE | 102018202120 | 8/2019 |

\* cited by examiner

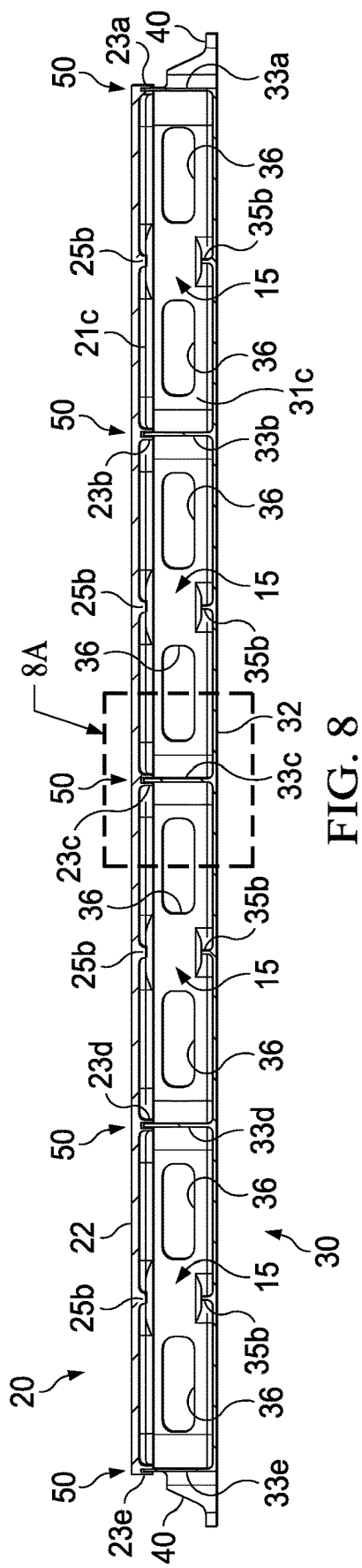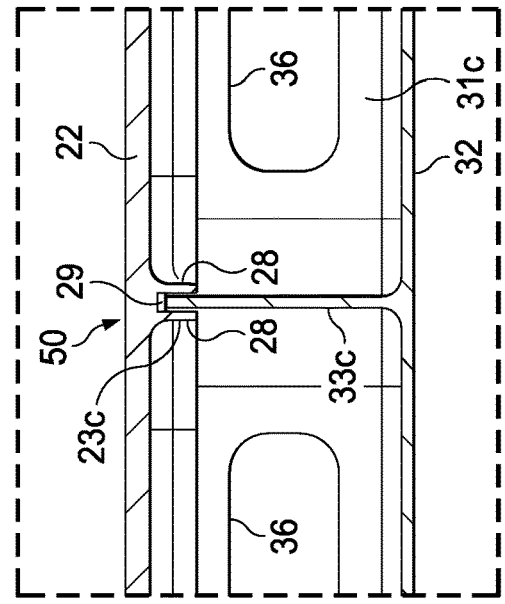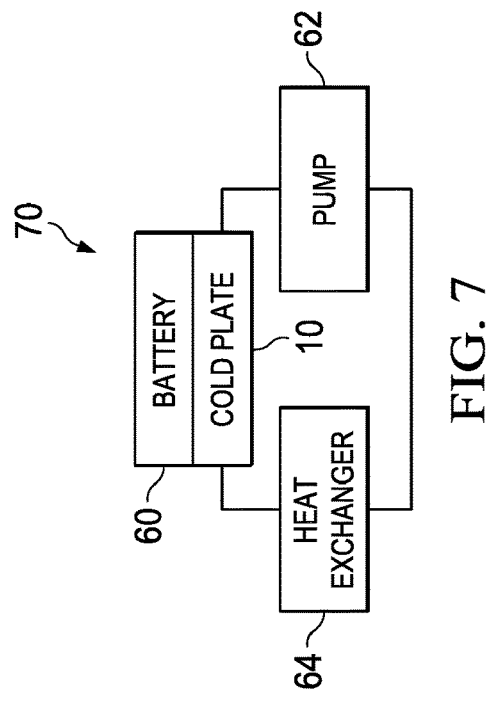

NON-INTEGRAL BATTERY COLD PLATE

TECHNICAL FIELD

The present disclosure is directed to heat transfer devices, and more particularly to battery cold plates for electric vehicles and aircraft.

BACKGROUND OF THE INVENTION

More and more vehicles are adopting electric power plants in an effort to provide alternatives to fossil fuels. The need for electric power means that batteries occupy more space in a vehicle, and charging the batteries becomes an important step in mission preparation. The thermal behavior of batteries and the charging process can create challenges that are unique from fossil fuel-based vehicles.

BRIEF SUMMARY OF THE INVENTION

One possible embodiment of the current disclosure comprises a method of charging one or more batteries in an electric vehicle. The method can comprise attaching a charging apparatus to the one or more batteries; coupling a nonintegrated cold plate to a surface of the one or more batteries, the nonintegrated cold plate comprising a top plate, a coolant entrance and exit, and a pathway to direct coolant from the coolant entrance to the coolant exit; charging the one or more batteries via the charging apparatus; circulating coolant through the nonintegrated cold plate such that the coolant is operable to cool (or condition or heat, as needed) the one or more batteries during charging; and detaching the nonintegrated cold plate.

Another possible embodiment comprises a cold plate for providing heat transfer for one or more batteries of an electric vehicle. The cold plate can comprise a coolant entrance port operable to receive coolant from an exterior source; a coolant exit port operable to direct coolant out of the cold plate; a top plate comprising one or more walls and an exterior ridge extending therefrom, the one or more walls defining a pathway from the coolant entrance port to the coolant exit port; a bottom plate configured to couple to the exterior ridge of the top plate and enclose the one or more walls; and one or more attachment mechanisms configured to selectively attach and detach the cold plate from a surface associated with the one or more batteries.

Another embodiment can comprise a coolant system for electric aircraft battery charging. The system can comprise a reservoir of coolant; a heat exchanger; a pump configured to draw coolant from the reservoir and comprising a supply line and a return line; and a cold plate for providing heat transfer for one or more batteries of the electric aircraft. The cold plate can comprise a coolant entrance port operable to receive coolant from the supply line; a coolant exit port operable to direct coolant out of the cold plate to the return line; a top plate comprising one or more walls and an exterior ridge extending therefrom, the one or more walls defining a pathway from the coolant entrance port to the coolant exit port; a bottom plate configured to couple to the exterior ridge of the top plate and enclose the one or more walls; and one or more attachment mechanisms configured to selectively attach and detach the cold plate from a surface associated with the one or more batteries. The pump is configured to circulate coolant through the cold plate while the one or more batteries are being charged such that heat is drawn away from the one or more batteries.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 7 is an illustration of a system embodiment under the present disclosure.

FIG. 8-8A are schematic and detail views of a cold plate under the present disclosure.

DETAILED DESCRIPTION OF THE INVENTION

Vehicles that use electric power have to charge their batteries from time to time. Because batteries are heavy, it can be desirable to lighten electric vehicles and aircraft wherever possible. Some batteries are most efficient at certain temperatures. And certain temperatures are better for charging versus during power drain during a flight or travel. It is desirable to provide a cold plate that can condition a battery to its optimum charge temperature then after charging, condition a battery to its optimum operating temperature. But cold plates can be heavy, adding to the payload of an aircraft or other vehicle. The present disclosure describes embodiments of apparatuses and methods for nonintegral cold plates that can be attached to a battery of an electric aircraft (or other vehicle) during charging, while landed or stopped. The cold plates can then be removed before flight or travel. The benefits of the current disclosure include thermal control of battery charging and the attendant efficiency and time benefits, as well as lighter weight during flight.

Figure 1:
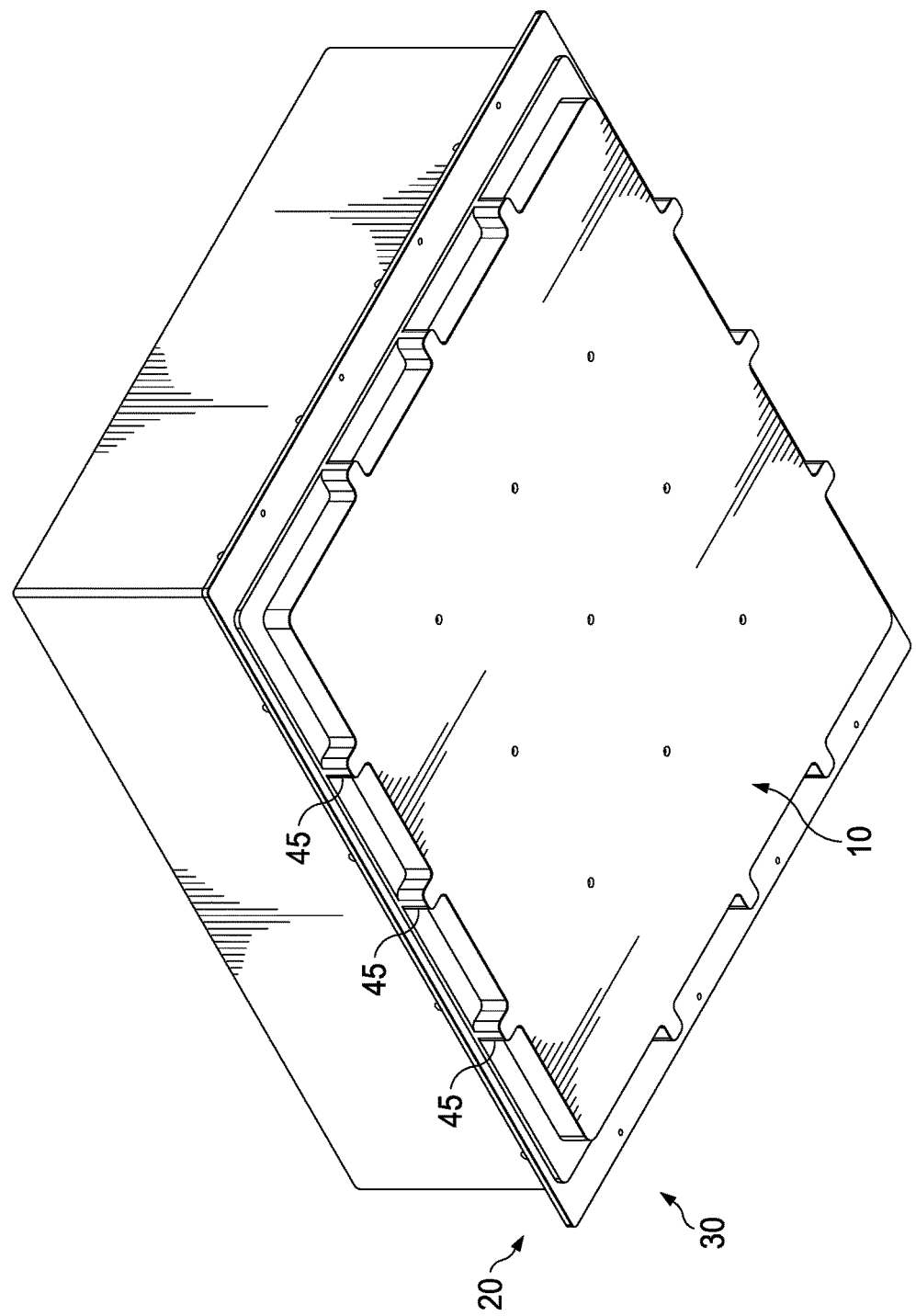
FIG. 1 is a schematic view of a cold plate and battery under the present disclosure.
Figure 2:
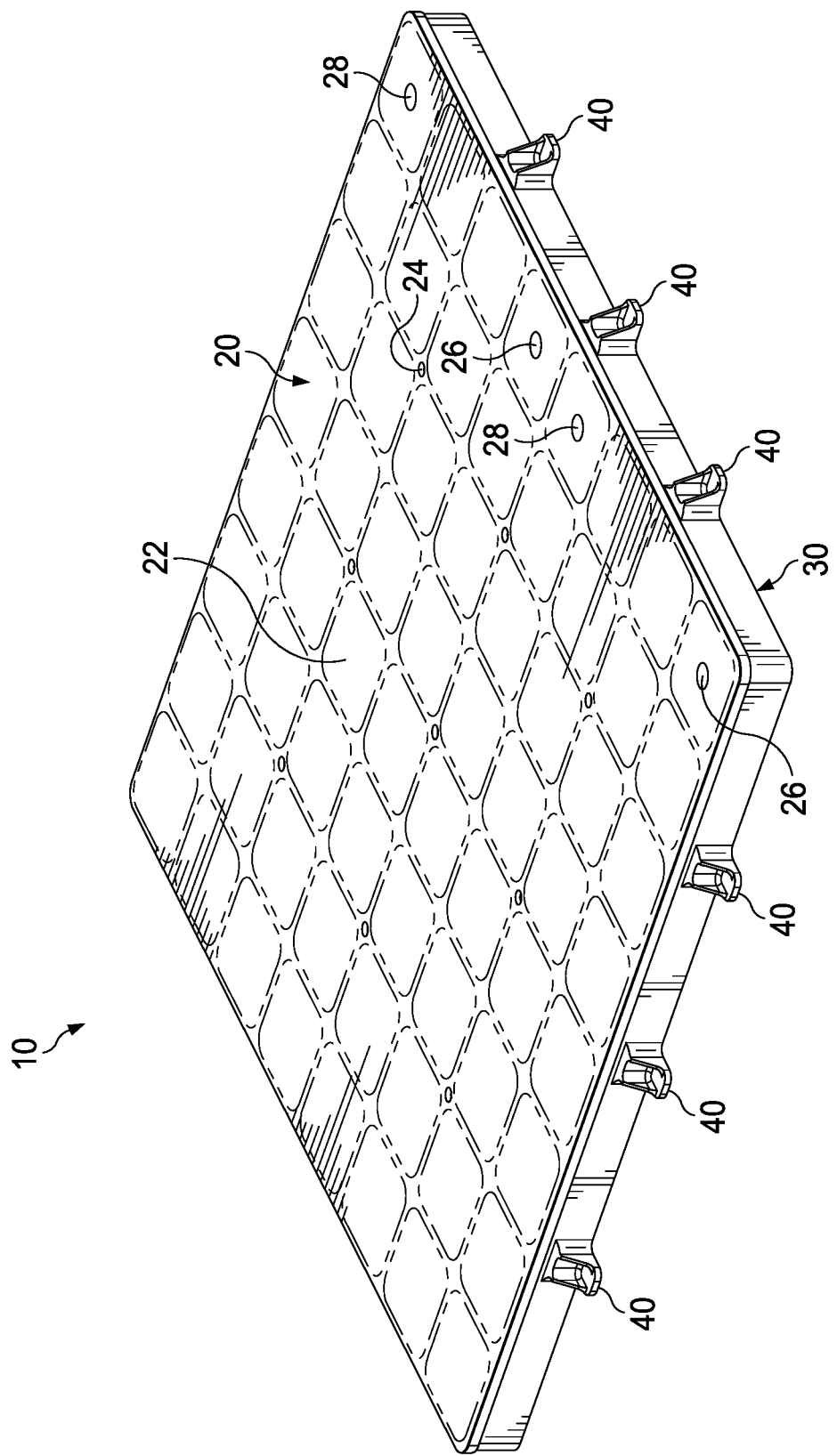
FIG. 2 is a schematic view of a cold plate under the present disclosure.
Figure 3:
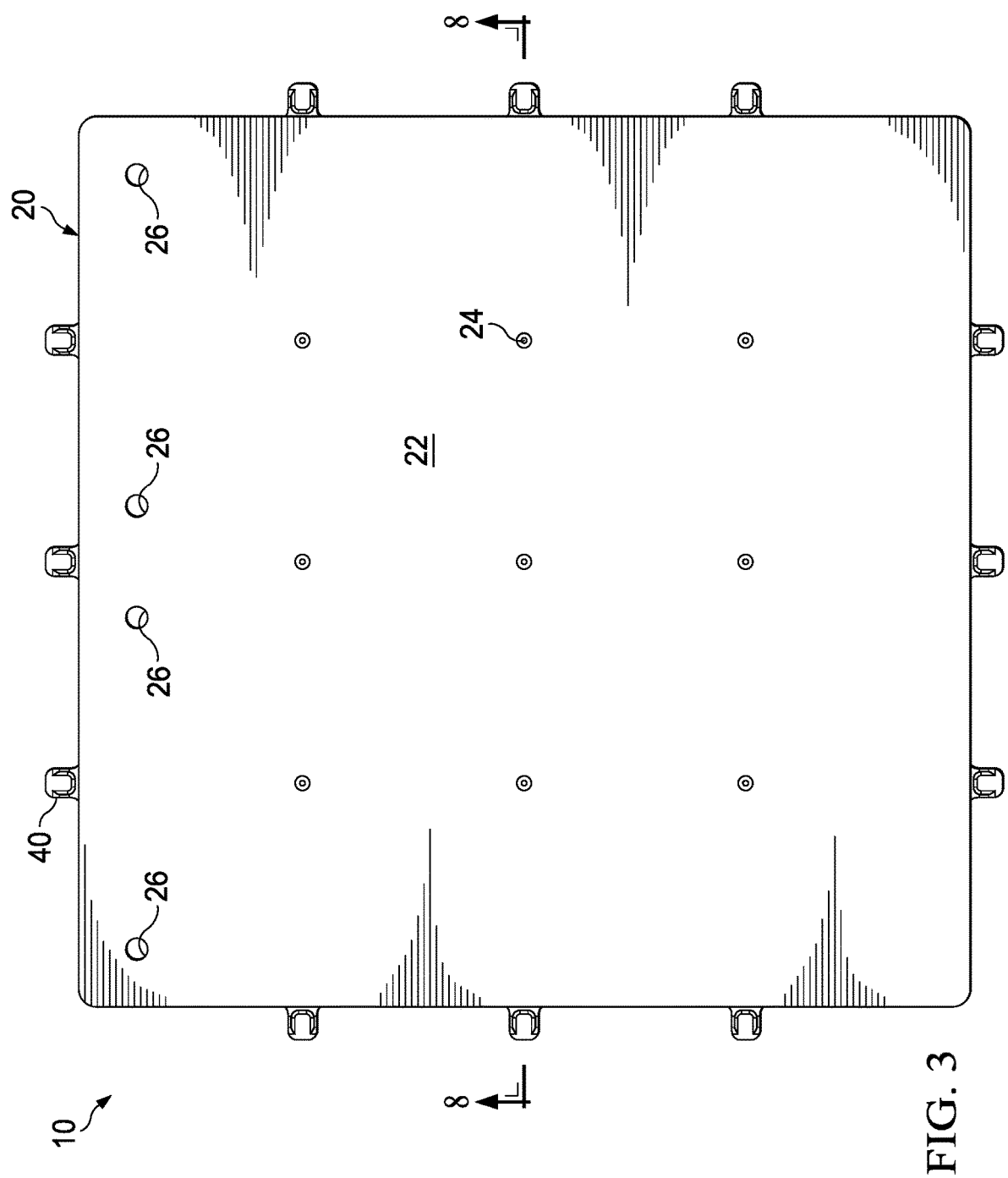
FIG. 3 is a top-down schematic view of a cold plate under the present disclosure.
Figure 4:
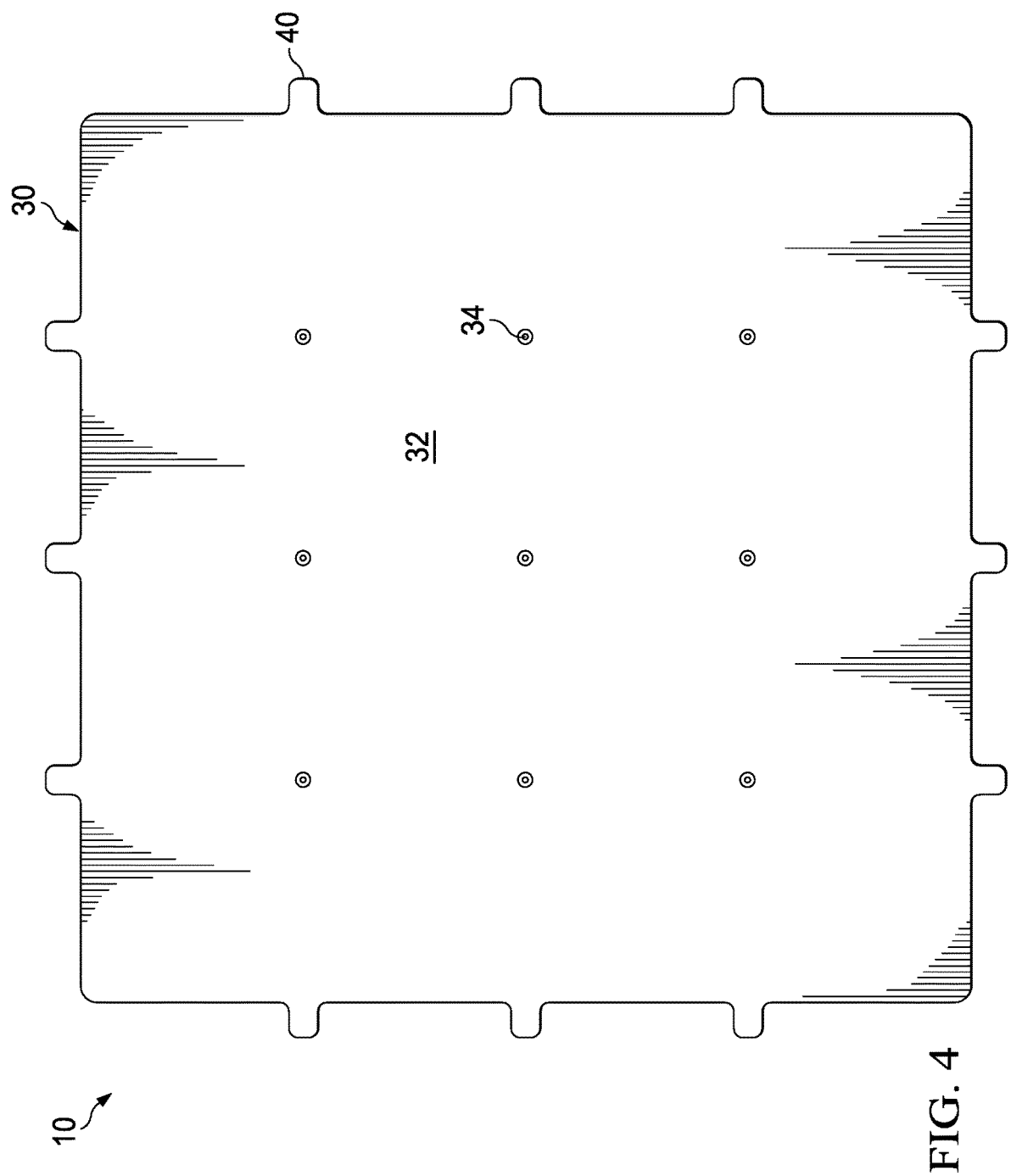
FIG. 4 is a bottom-up schematic view of a cold plate under the present disclosure.

Referring now to FIG. 1, a battery 20 and cold plate 10 embodiment can be seen. Aircraft skin 30 sits between the battery 20 and cold plate 10. Attachments 45 allow for bolting the cold plate 10 to the skin 30. In an embodiment such as in FIG. 1, an aircraft can land from a flight, and cold plate 10 can be bolted on to skin 30 while battery 20 is being charged. Once charging is complete, cold plate 10 can be removed and the aircraft can proceed to another flight or mission. Because the cold plate is not kept on the aircraft this allows for lighter payload, allowing the aircraft to travel further or longer. Cold plates often utilize liquid coolants, which can be heavy. Under the present disclosure liquid coolant can be avoided in terms of the vehicle payload.

Referring now to FIG. 2-5, an embodiment of a cold plate 10 is shown for providing localized cooling to a component that generates heat, such as a battery or other electrical component, as well as providing support for such component. Cold plate 10 comprises a top plate 20 coupled with a bottom plate 30. In the illustrated version, top plate 20 is positioned above bottom plate 30 in a substantially parallel relationship relative to bottom plate 30 such that cold plate 10 is configured to receive a cooling medium (e.g., air, water, glycol solutions, etc.) between top plate 20 and bottom plate 30. Top plate 20 and bottom plate 30 can be made from any suitable thermally conductive material, such as aluminum, copper, steel, or any other suitable metal. Top plate 20 of the illustrated version comprises a body 22 having two or more ports 26 that are configured to allow the cooling medium to flow into and/or out of cold plate 10 through ports 26. In the illustrated version, body 22 includes four ports 26 such that one or two ports 26 can be used as an input of the cooling medium within cold plate 10 and another one or two ports 26 can be used as an output of the cooling medium out of cold plate 10. Still other suitable configurations for ports 26 will be apparent to one with ordinary skill in the art in view of the teachings herein. For instance, additionally or alternatively, ports 26 can be provided through bottom plate 30. Ports 26 can comprise connections for receiving supply and return lines from a reservoir of coolant or a coolant device.

Figure 5:
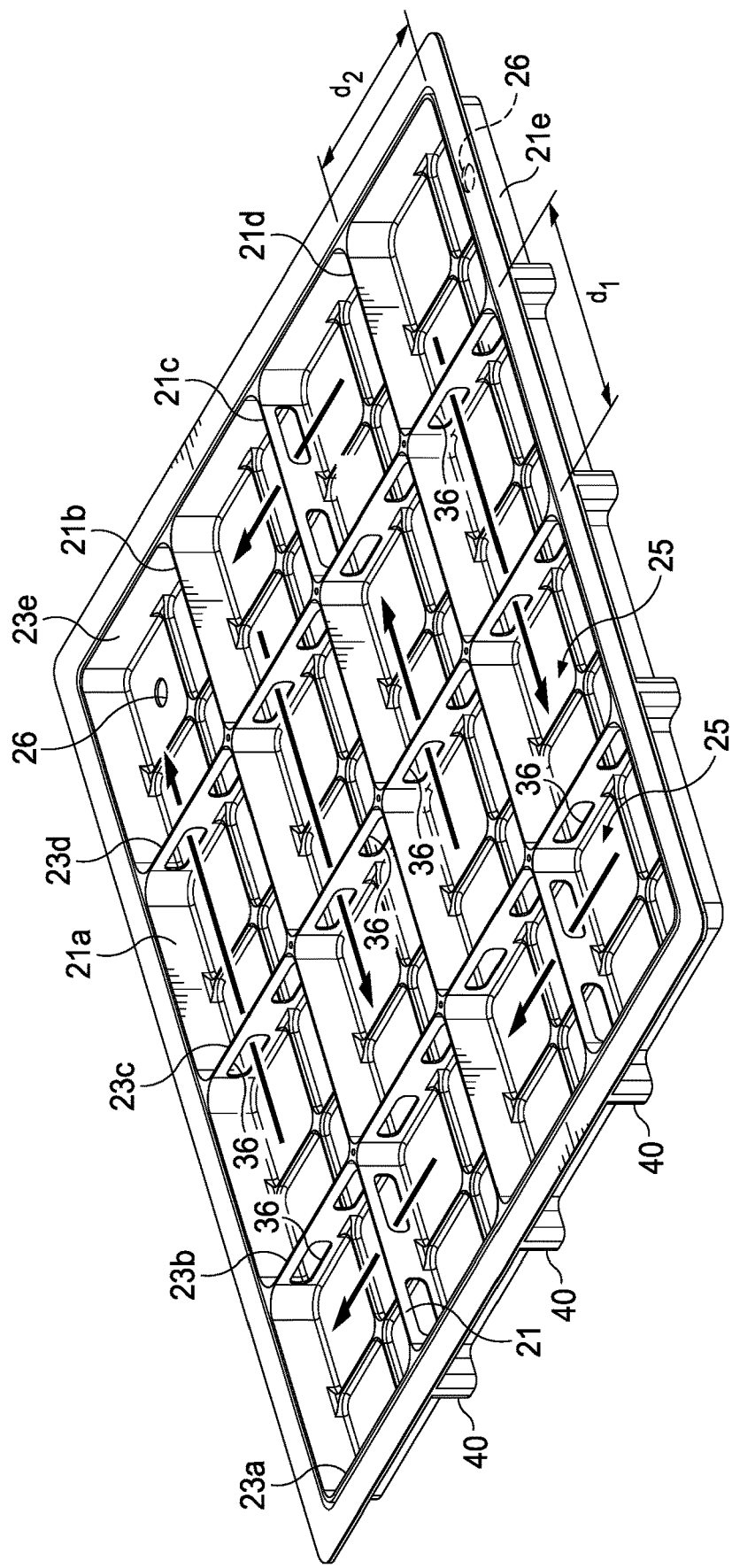
FIG. 5 is a schematic view of an open face embodiment or the top plate under the present disclosure.

FIG. 5 shows an embodiment of top plate 20 with no attached bottom plate, allowing an internal view. Alternatively, FIG. 5 can show an "open face" embodiment, described further below. As shown, top plate 20 includes five lateral walls 21a, 21b, 21c, 21d, 21e and five longitudinal walls 23a, 23b, 23c, 23d, 23e to form a generally square body 22, though any other suitable number of walls 21, 23 can be used to form any other suitable shaped body 22 (e.g., rectangle, circular, triangular, etc.). Exterior walls 21a, 21e, 23a, 23e of top plate 20 of the illustrated version include a plurality of couplings 40 extending outwardly from exterior walls 21a, 21e, 23a, 23e that are configured to couple cold plate 30 with a battery, aircraft skin, or other surface. For instance, couplings 40 can receive a fastener (e.g., a clamp, a screw, a bolt, a nail, an adhesive, etc.) to couple cold plate 30 with another structure. Still other suitable configurations for mounting cold plate 10 will be apparent to one with ordinary skill in the art in view of the teachings herein. For instance, additionally or alternatively, couplings 40 can be provided on top plate 20. Walls 21, 23 can be configured to provide additional structure for top plate 20 and/or to couple top plate 20 with bottom plate 30, as will be discussed in more detail below. Each lateral wall 21 extends laterally along body 22 with each lateral wall 21 spaced apart from one another at a distance $d_1$. Each longitudinal wall 23 extends longitudinally along body 22, transversely relative to lateral walls 21, with each longitudinal wall 23 spaced apart from one another at a distance $d_2$. In the illustrated version, distances $d_1$, $d_2$ are substantially equal between each wall 21, 23. In some other versions, distances $d_1$, $d_2$ can differ between one or more walls 21, 23. As shown in FIG. 5, top plate 20 includes five lateral walls 21a, 21b, 21c, 21d, 21e and five longitudinal walls 23a, 23b, 23c, 23d, 23e to form a generally square body 22, though any other suitable number of walls 21, 23 can be used to form any other suitable shaped body 22 (e.g., rectangle, circular, triangular, etc.).

Lateral walls 21 and longitudinal walls 23 are thereby configured to intersect with each other at intersection points 27. Top plate 20 includes an opening 24 extending through body 22 at each intersection point 27. Openings 24 are configured to receive a fastener (e.g., a screw, a bolt, a nail, etc.) through openings 24 to couple top plate 20 and/or bottom plate 30 with a component for cooling. While the illustrated version shows an opening 24 at each intersection point, any other suitable number of openings 24 can be used for coupling cold plate 10 with a component. Each wall 21, 23 further includes a recess 29 extending inwardly within each wall 21, 23 that are configured to receive bottom plate 30. While FIG. 5 shows one embodiment of the internal structure of a cold plate, a variety of setups are possible. Any format that allows coolant to enter the cold plate, provide heat transfer, and then exit the plate, is workable.

As shown in FIG. 5, lateral walls 21 and longitudinal walls 23 are arranged to form a chamber 35 between each pair of adjacent lateral walls 21 and each pair of adjacent longitudinal walls 33. For illustrative purposes, a chamber 25 is formed between lateral walls 21a, 21b and longitudinal walls 23a, 23b. Chambers 25 of top plate 20 are thereby configured to receive a cooling medium within chambers 25. In the illustrated version, one or more channels 36 are formed through one or more select walls 21, 23 of top plate 20 that are configured to allow the cooling medium to flow through channels 36 between chambers 25. For instance, a pair of channels 36 is formed through each interior lateral wall 21b, 21c, 21d in each chamber 25. A pair of channels 36 are also formed through interior longitudinal walls 23b, 23c, 23d at an end portion of each interior longitudinal wall 23b, 23c, 23d. Still other suitable configurations for channels 36 will be apparent to one with ordinary skill in the art in view of the teachings herein for allowing the cooling medium to flow within cold plate 10.

Figure 6:
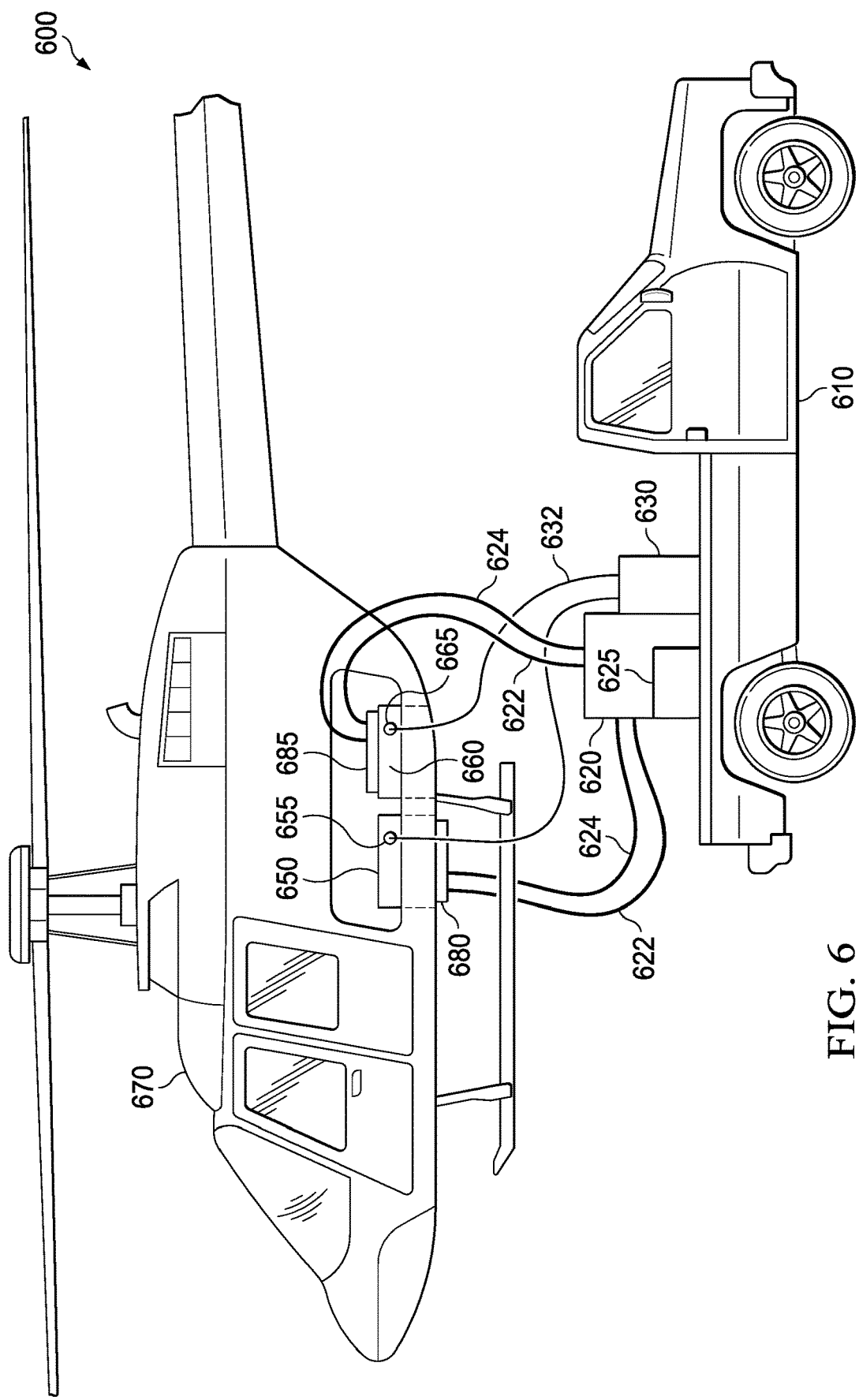
FIG. 6 is an illustration of a system embodiment under the present disclosure.

FIG. 6 shows a possible embodiment of a coolant system 600. Vehicle 610 can be used to provide cold plates 680, 685 to assist in charging batteries 650, 660 of an aircraft 670. Cold plates 680, 685 can bolt onto the aircraft exterior to cool battery 650, or bolt onto battery 660 directly. Bolts or other attachment mechanisms can be used. Coolant device 620 can pump coolant within lines 622, 624 to the cold plates 680, 685. Coolant supply 625 can store coolant. Coolant device 620 may be operable to heat and or cool the coolant to desired temperatures. Vehicle 610 may also comprise a battery charger 630 that can connect via lines 632 to batteries 650, 660 at connections 655, 665. In this way, coolant device 620 with cold plates 680, 685 can provide proper cooling while battery charger 630 charges the batteries 650, 660. Battery charger 630 and coolant device 620 can comprise separate devices or comprise separate vehicles. Two examples shown here are a cold plate 680 attached to the bottom surface of aircraft 670, and cold plate 685 attached to the top of battery 660. Other embodiments may comprise a cold plate attached to a side of a battery, or an aircraft. Types of coolant used can include glycol water mixes, other coolants are possible.

Referring to FIG. 7, another view of a cooling system can be seen. Cold plate 10 can be incorporated into a cooling system 70 for providing cooling to a component. In the illustrated version, cold plate 10 is coupled with a battery 60, although any other suitable electrical component that generates heat can be used. Battery 60 can be attached to top plate 20 or bottom plate 30 by inserting fasteners through a housing of battery 60 and openings 24, 34 of top and/or bottom plate 30 to maintain the position of battery 60 relative to cold plate 10. Still other suitable methods for attaching battery 60 with cold plate 10 will be apparent to one with ordinary skill in the art in view of the teachings herein. Cold plate 10 is then coupled with a pump 62 and a heat exchanger 64. Pump 62 and heat exchanger 64 can comprise components of coolant device 620 in FIG. 6. Pump 62 is configured to pump the cooling medium through cold plate 10 and heat exchanger 64. Heat exchanger 64 is configured to cool the cooling medium. Accordingly, pump 62 can pump the cooling medium that has been cooled by heat exchanger into cold plate 10 to provide cooling of battery 60. For instance, heat generated from battery 60 flows by conduction through top or bottom plate 20, 30 of cold plate 10. The heat then flows by convection from an internal surface of top or bottom plate 20, 30 to the cooling medium flowing through cold plate 10. Pump 62 can then pump the heated cooling medium to heat exchanger 64 to cool the heated cooling medium, such that it can be cycled back to cold plate 10 to continue cooling battery 62.

A cold plate with coolant as described herein may be used to achieve different temperatures at different times. At the start of charging, a typical electric airplane battery(ies) may be sitting at 20°-40° C. The most efficient charging temperature might be 50°-60° C. The cold plate and coolant can be used to, at the beginning of charging, quickly raise the temperature to 50°-60° C., for example. Once that range is achieved, the cold plate and coolant may be used to cool, or maintain that temperature, and keep the battery from heating up even further as it charges. After charging is complete, the cold plate and coolant can allow for cooling the battery quickly to 10°-15° C., the best temperature to have prior to takeoff. Desired temperatures can vary by battery model and size. To accomplish heating functionality, coolant system 600 and/or coolant device 620 of FIG. 6 may have heating apparatuses to heat coolant.

FIGS. 8-8A shows an embodiment of the plates of FIGS. 2-5, with more detail as to how the bottom and top plates may fit together. As shown in FIGS. 8-8A, top plate 20 is assembled with bottom plate 30 to align walls 21, 23 of top plate 20 with the respective walls 31, 33 of bottom plate 30 to form an interlocking joint 50 between each wall 21, 23 of top plate 20 and each wall 31, 33 of bottom plate 30. As best seen in FIG. 8A, each interlocking joint 50 comprises a pair of protrusions 28 extending downwardly from each wall 21, 23 of top plate 20 that form a recess 29 therebetween. An end portion of each wall 31, 33 of bottom plate 30 is insertable within recess 29 of each wall 21, 23 of top plate 20 such a portion of walls 21, 23 of top plate 20 enclose a portion of walls 31, 33 of bottom plate to interlock walls 21, 23, 31, 33 to form an interlocking joint 50. Interlocking joints 50 are thereby formed laterally along cold plate 10 between each lateral wall 21 of top plate 20 and each lateral wall 31 of bottom plate 30 and longitudinally along cold plate 10 between each longitudinal wall 23 of top plate 20 and each longitudinal wall 33 of bottom plate 30. Accordingly, walls 21, 23 of top plate 20 and walls 31, 33 of bottom plate 30 align chambers 25 of top plate 20 with chambers 35 of bottom plate 30 to form a plurality of compartments 15 within cold plate 10 for receiving the cooling medium therein. Top plate 20 can be bonded, such as with epoxy, friction stir welded, fasteners, etc., with bottom plate 30 at interlocking joints 50 to provide a fluid-tight seal between walls 21, 23 of top plate 20 and walls 31, 33 of bottom plate 30. Such interlocking joints 50 can be configured to provide the fluid-tight seal to inhibit the cooling medium from leaking from cold plate 10 to the component supported by cold plate 10 in a vibrational environment, such as during operation of an aircraft.

Some embodiments under the present disclosure can comprise an "open face" form factor. For example, the top plate 20 shown in FIG. 5 could be attached directly to an aircraft skin or battery face. Attachment could be by bolts, clamps or another appropriate mechanism. An o-ring, or other seal, around the edge of top plate 20 could provide a waterproof seal. Coolant could then be pumped into the plate to achieve the cooling described herein. In this "open face" embodiment there would be greater thermal efficiency as the coolant is directly on the aircraft skin or battery face. A possible drawback could be residue of coolant left on the aircraft or battery. Leaks may be possible. As such, this embodiment may work best when attached to the exterior of the aircraft.

Figure 9:
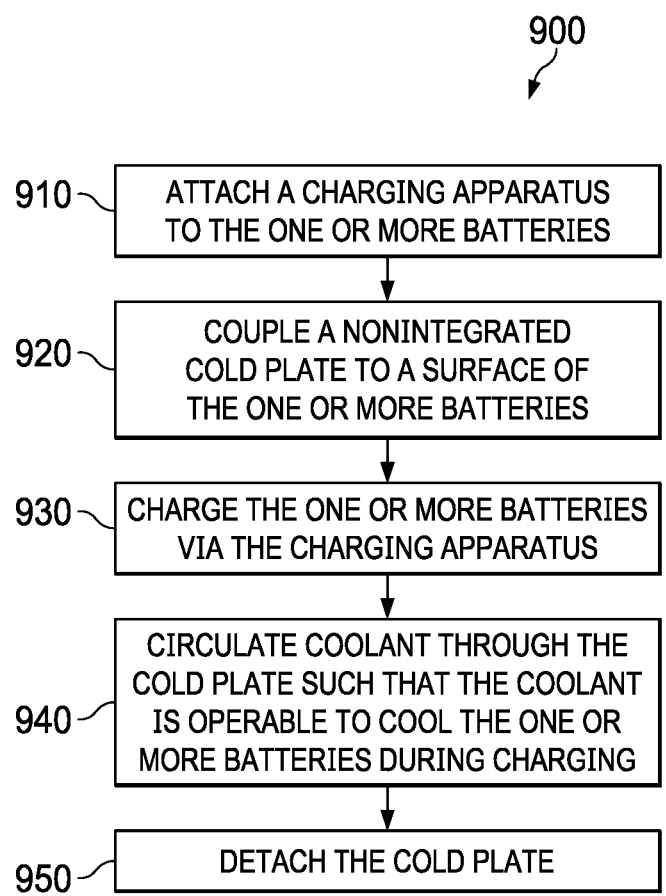
FIG. 9 is a flow chart view of a method embodiment under the present disclosure.

FIG. 9 shows a possible method embodiment 900 of charging and providing heat transfer to a battery under the present disclosure. At 910, a charging apparatus is attached to the one or more batteries, the charging apparatus operable to recharge a power supply of the one or more batteries. At 920, a nonintegrated cold plate is coupled to a surface of the one or more batteries, the nonintegrated cold plate comprising a top plate, a coolant entrance and exit, and a pathway to direct coolant from the coolant entrance to the coolant exit. Step 930 is charging the one or more batteries via the charging apparatus. Step 940 is circulating coolant through the nonintegrated cold plate such that the coolant is operable to cool (or condition, or heat, as needed) the one or more batteries during charging. Step 950 is detaching the nonintegrated cold plate.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of charging one or more batteries in an electric vehicle, comprising:

attaching a charging apparatus to the one or more batteries, the charging apparatus operable to recharge a power supply of the one or more batteries;

coupling a nonintegral cold plate to a surface of the one or more batteries, the nonintegral cold plate comprising a top plate, a coolant entrance and exit coupled to a coolant supply, and a pathway to direct coolant from the coolant entrance to the coolant exit, the top plate comprising exterior walls configured to house the pathway;

charging the one or more batteries via the charging apparatus;

circulating coolant through the nonintegral cold plate such that the coolant is operable to cool the one or more batteries during charging; and detaching the nonintegrated cold plate.

2. The method of claim 1 wherein the coolant comprises a glycol and water mix.

3. The method of claim 1 wherein the one or more batteries comprises a lithium-ion battery.

4. The method of claim 1 wherein the one or more batteries comprises a solid-state battery.

5. The method of claim 1 wherein the nonintegrated cold plate is coupled to the one or more batteries by bolts.

6. The method of claim 1 further comprising temporarily heating the coolant and circulating the heated coolant through the nonintegrated cold plate.

7. The method of claim 1 wherein the nonintegrated cold plate further comprises a bottom plate, the bottom plate configured to couple to the top plate and to couple to the surface of the one or more batteries.

8. The method of claim 1 wherein the nonintegrated cold plate comprises an open face, the open face operable to couple to the surface of the one or more batteries and to retain coolant within the pathway while coolant is being circulated.

\* \* \* \* \*